(12) United States Patent
Ohara et al.

(10) Patent No.: US 8,003,916 B2
(45) Date of Patent: Aug. 23, 2011

(54) INDUSTRIAL ROBOT

(75) Inventors: Takayasu Ohara, Osaka (JP); Seiji Iwai, Hyogo (JP)

(73) Assignee: Panasonic Corporation, Osaka (JP)

( * ) Notice: Subject to any disclaimer, the term of this patent is extended or adjusted under 35 U.S.C. 154(b) by 1375 days.

(21) Appl. No.: 10/586,129

(22) PCT Filed: Jan. 24, 2006

(86) PCT No.: PCT/JP2006/300989
§ 371 (c)(1),
(2), (4) Date: Jul. 17, 2006

(87) PCT Pub. No.: WO2007/026438
PCT Pub. Date: Mar. 8, 2007

(65) Prior Publication Data
US 2008/0271561 A1 Nov. 6, 2008

(30) Foreign Application Priority Data
Aug. 29, 2005 (JP) ................. 2005-247120

(51) Int. Cl.
*B23K 9/10* (2006.01)
*G05G 1/00* (2008.04)
(52) U.S. Cl. ........... 219/137.31; 219/124.34; 219/125.1; 219/125.11; 74/469; 74/479.01; 74/490.01; 74/490.02
(58) Field of Classification Search ........... 74/490.01, 74/490.02, 479.01, 469; 219/124.34, 137.9, 219/137.31, 125.1, 125.11
See application file for complete search history.

(56) References Cited

U.S. PATENT DOCUMENTS

| 4,952,769 | A | * | 8/1990 | Acheson | 219/76.14 |
| 5,293,107 | A | | 3/1994 | Akeel | |
| 5,606,235 | A | | 2/1997 | Mauletti | |
| 6,250,174 | B1 | * | 6/2001 | Terada et al. | 74/490.02 |
| 2004/0261562 | A1 | * | 12/2004 | Haniya et al. | 74/490.02 |
| 2005/0166699 | A1 | * | 8/2005 | Meyerhoff et al. | 74/490.01 |

FOREIGN PATENT DOCUMENTS

| EP | 1 568 449 A1 | 8/2005 |
| EP | 1 669 151 A1 | 6/2006 |
| JP | 63-95674 | 6/1988 |
| JP | 6-315879 A | 11/1994 |
| JP | 06-86868 | 12/1994 |
| JP | 6-86868 U | 12/1994 |

(Continued)

OTHER PUBLICATIONS

JP08-057648A-1996.pdf machine translation.*

(Continued)

*Primary Examiner* — Henry Yuen
*Assistant Examiner* — Ket D Dang
(74) *Attorney, Agent, or Firm* — RatnerPrestia

(57) ABSTRACT

An industrial robot has a base for installation, a first arm, a second arm, a third arm, a wire feeder, a welding torch, and a torch cable. The first arm rotates with respect to the base. The second arm pivots with respect to the first arm. The third arm pivots with respect to the second arm. The torch cable is coupled to the wire feeder and feeds a welding wire to a welding torch. The wire feeder is provided to the second arm and is rotatable around a rotation axis.

11 Claims, 5 Drawing Sheets

FOREIGN PATENT DOCUMENTS

| | | |
|---|---|---|
| JP | 7-205065 A | 8/1995 |
| JP | 08-057648 | 3/1996 |
| JP | 8-57648 A | 3/1996 |
| JP | 08057648 A * | 3/1996 |
| JP | 08-155881 | 6/1996 |
| JP | 10-175188 A | 6/1998 |
| JP | 2004-261878 | 9/2004 |
| JP | 2006-007256 | 1/2006 |
| WO | WO 2006/001177 A1 | 1/2006 |

OTHER PUBLICATIONS

Japanese Search Report for Application No. PCT/JP2006/300989 dated Apr. 25, 2006.
English translation of Form PCT/ISA/210.
Supplementary European Search Report for EP 06 71 2205, Oct. 2, 2009.
JP Office Action for JP 2006-520434 (with partial English translation), May 15, 2009.

* cited by examiner

INDUSTRIAL ROBOT

This application is a U.S. national phase application of PCT International Application PCT/JP2006/300989.

TECHNICAL FIELD

The present invention relates to an industrial robot used for welding, for example, and used in floor-mounted or a ceiling-mounted installation.

BACKGROUND ART

Conventionally, as an installing and using method of a welding multi-joint robot (an industrial robot), floor-mounted use, ceiling-mounted use, or the like, is generally known. FIG. 6 is a perspective view showing such an industrial robot when it is used in a state in which it is mounted on a floor. FIG. 7 is a side view showing such an industrial robot when it is used in a state in which it is mounted on a ceiling.

First arm 112 rotates with respect to base 111 for installation. Second arm 113 pivots with respect to first arm 112, and third arm 114 pivots with respect to second arm 113. Furthermore, fourth arm 115 pivots with respect to third arm 114. Welding wire feeder 116 feeds a welding wire. Fixing device 117 fixes welding wire feeder 116 to the industrial robot. Torch cable 118 feeds the welding wire from welding wire feeder 116 to welding torch 119.

In FIG. 6, welding wire feeder 116 is fixed to the upper part of third arm 114. Such a configuration is disclosed in, for example, Japanese Patent Unexamined Publication No. 2004-261878. Furthermore, in FIG. 7, welding wire feeder 116 is fixed to the side face of third arm 114. Such a configuration is disclosed in, for example, Japanese Patent Unexamined Publication No. H8-57648. Thus, in a conventional welding multi-joint robot, the position to which welding wire feeder 116 is attached is different between the time of floor-mounted use and the time of ceiling-mounted use. That is to say, the structure (specification) is generally different between the floor-mounted use and the ceiling-mounted use.

Therefore, when a robot used in a state in which it is mounted on the floor is used in a state in which it is mounted on the ceiling, or when a robot used in a state in which it is mounted on a ceiling is used in a state in which it is mounted on a floor, the position to which welding wire feeder 116 is attached has to be changed. In order to correspond to such a change, it is necessary to provide fixing positions of wire feeder 116 for both floor-mounted use and ceiling-mounted use. That is to say, two or more positions to which wire feeder 116 is attached need to be provided. Furthermore, it is necessary to prepare attaching members for fixing welding wire feeder 116 corresponding to each use form of floor-mounted use and ceiling-mounted use. Thus, it takes a time to change the use forms, and the cost therefor rises.

Furthermore, in coupling of a feeder cable for electrically coupling between welding wire feeder 116 and the inside the robot, it is necessary to additionally consider a wiring method corresponding to each use form. Thus, it takes a time to change the coupling corresponding to the use form.

Furthermore, in the structure shown in FIG. 7, welding wire feeder 116 is attached to the side face of third arm 114. Therefore, the distance between a location of the center of gravity of welding wire feeder 116 and the industrial robot (the arm) is increased, and a moment load to fixing device 117 for attaching welding wire feeder 116 is increased.

In order to resist this load, the strength and rigidity of fixing device 117 is required to be increased. That is to say, the size and mass of a member constituting fixing device 117 may be increased. Such a configuration deteriorates the motion performance of the industrial robot and adversely affects the approaching performance to a welding work and a jig for fixing the welding work.

SUMMARY OF THE INVENTION

An industrial robot of the present invention includes a base for installation, a first arm, a second arm, a third arm, a wire feeder, a welding torch, and a torch cable. The first arm rotates with respect to the base. The second arm pivots with respect to the first arm. The third arm pivots with respect to the second arm. The torch cable is coupled to the wire feeder and feeds a welding wire to the welding torch. The wire feeder is provided to the second arm and is rotatable around a rotation axis. In this structure, a position in which the wire feeder is provided is common in a robot used in a state in which it is mounted on a floor and a robot used in a state in which it is mounted on a ceiling. Then, by rotating the wire feeder, floor-mounted use and ceiling-mounted use become possible.

DETAILED DESCRIPTION OF THE PREFERRED EMBODIMENT

Figure 1:
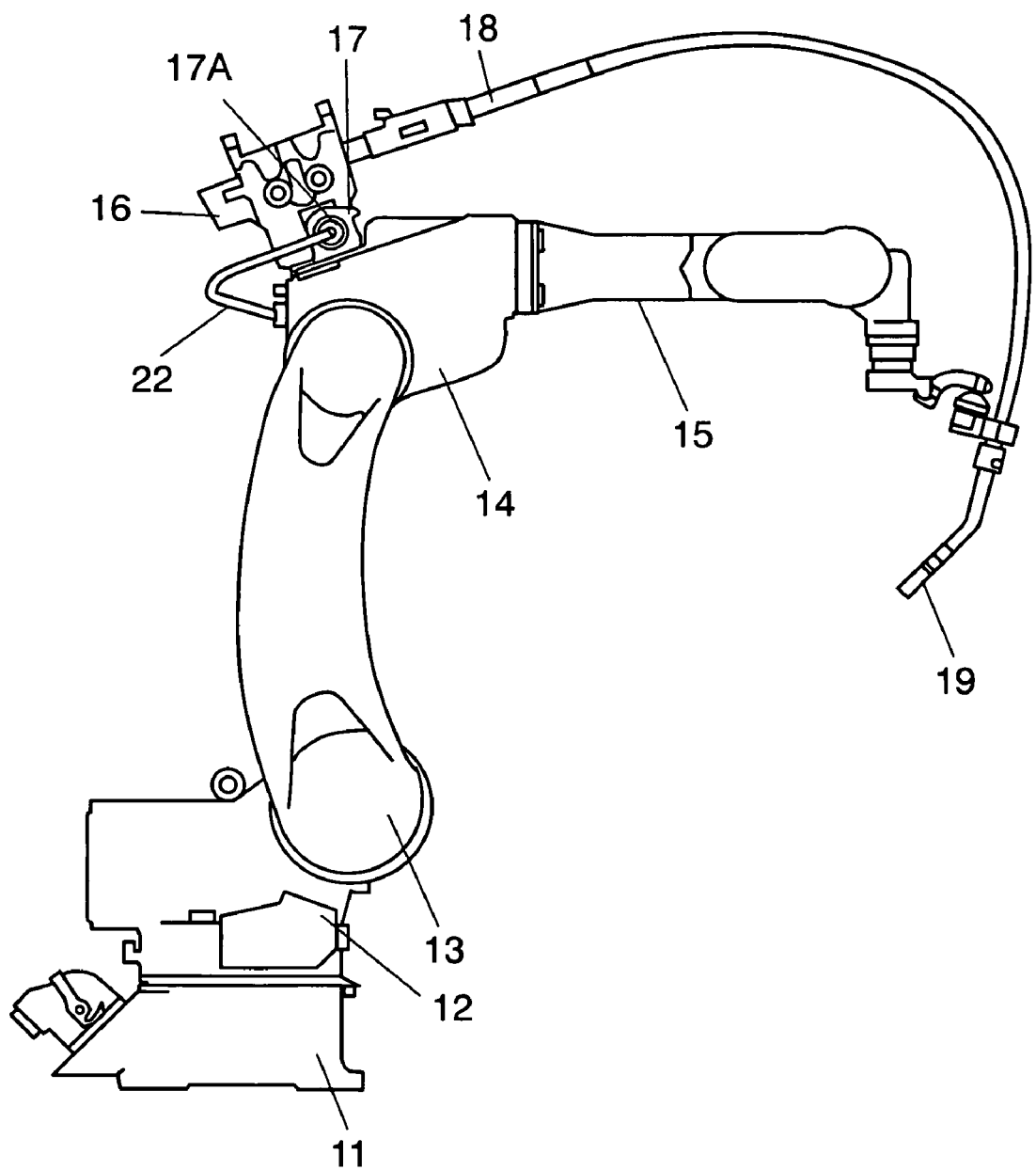
FIG. 1 is a side view showing a state of an industrial robot at the time of floor-mounted installation in accordance with an exemplary embodiment of the present invention.

FIG. 1 is a side view showing an industrial robot in a state in which it is mounted on a floor in accordance with the present exemplary embodiment.

Figure 2:
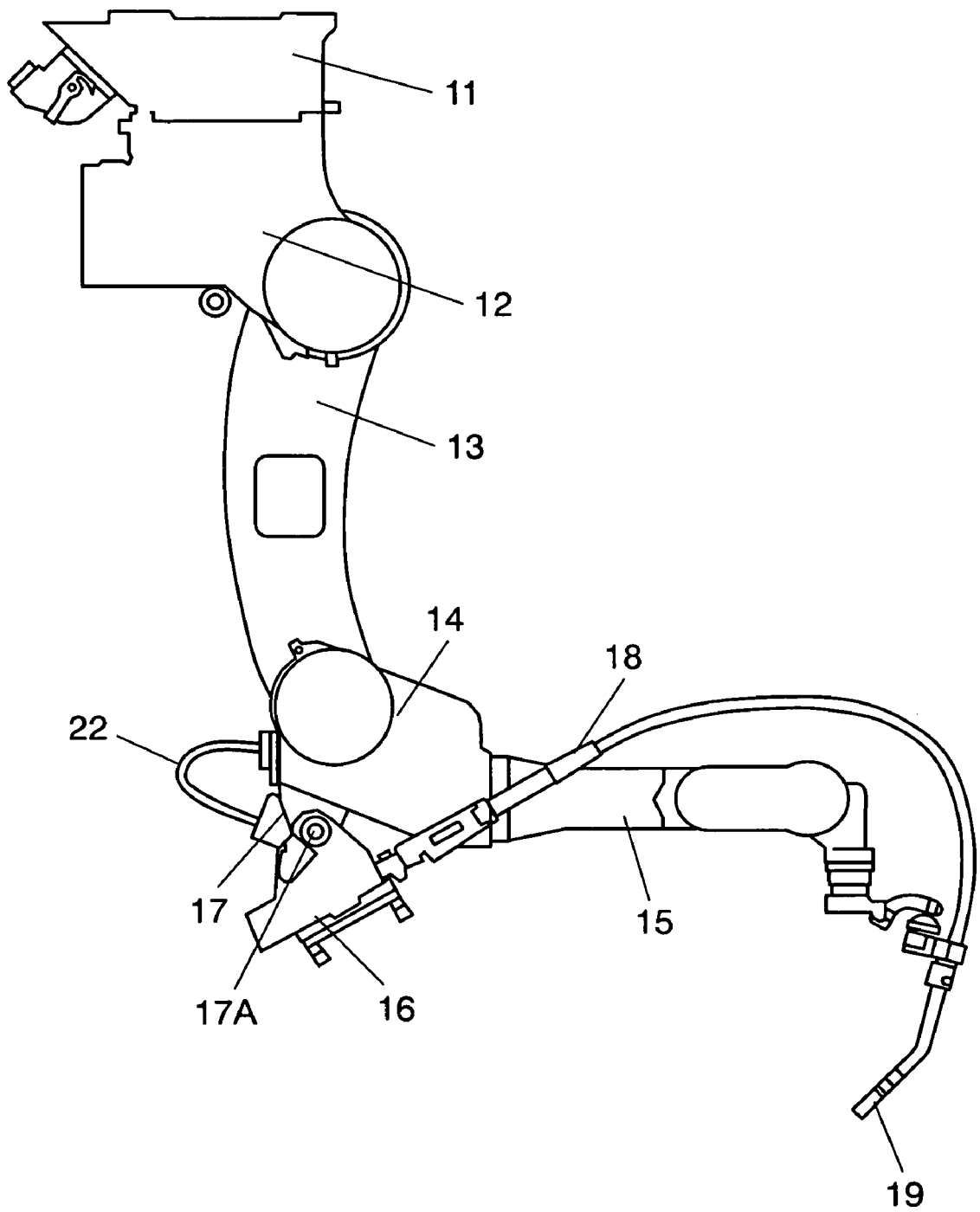
FIG. 2 is a side view showing a state of the industrial robot at the time of ceiling-mounted installation in accordance with the exemplary embodiment of the present invention.

FIG. 2 is a side view showing the industrial robot in a state in which it is mounted on a ceiling. In the following description, the direction of an industrial robot seen from a floor surface or a ceiling surface is defined as an upper side.

Base 11 is provided to install the industrial robot on a floor surface, a ceiling surface, or the like. First arm 12 rotates with respect to base 11. Fourth arm 13 pivots with respect to first arm 12, and second arm 14 pivots with respect to fourth arm 13. That is to say, second arm 14 pivots with respect to first arm 12. Third arm 15 pivots with respect to second arm 14. Welding wire feeder (hereinafter, referred to as "feeder") 16 is provided at the upper side of second arm 14. Torch cable 18 feeds a welding wire from feeder 16 to welding torch 19.

Fixing device 17 is provided to attach feeder 16 to second arm 14. Fixing device 17, which has rotation axis 17A for allowing feeder 16 to turn, rotatably fixes feeder 16 and fixes the rotation angle of feeder 16. Thus, fixing device 17 fixes feeder 16 at a position in which feeder 16 is offset in the horizontal direction to a degree in which torch cable 18 attached to feeder 16 does not interfere with third arm 15. That is to say, feeder 16 is provided to second arm 14 and can rotate around rotation axis 17A.

Fourth arm 13 is attached like a cantilever to first arm 12 and second arm 14. That it to say, fourth arm 13 is attached to one side face of first arm 12 and to one side face of second arm 14. Feeder 16 is located on the opposite side to fourth arm 13 relatively to a rotating axis (not shown) of first arm 12. The rotating axis of first arm 12 is an axis for rotatably attaching a first arm 12 to base 11.

If feeder 16 is attached to the same side as fourth arm 13 relatively to the rotating axis of first arm 12, when second arm 14 pivots, feeder 16 interferes with fourth arm 13. Therefore, the operation range of second arm 14 is restricted. Furthermore, in order to avoid the interference of feeder 16 to fourth arm 13, the position to which feeder 16 is attached is required to be offset to the outside of fourth arm 13. This structure leads to increase in the size and weight of fixing device 17, resulting in deterioration of the motion performance and approaching performance to a welding work, etc. in an industrial robot.

When feeder 16 is attached to the opposite side to fourth arm 13 relatively to the rotating axis of first arm 12, problems associated with interference mentioned above or unnecessary increase in the size and weight of fixing device 17 do not arise. Therefore, deterioration of the motion performance and approaching performance to a welding work, etc. in an industrial robot can be prevented.

Figure 3:
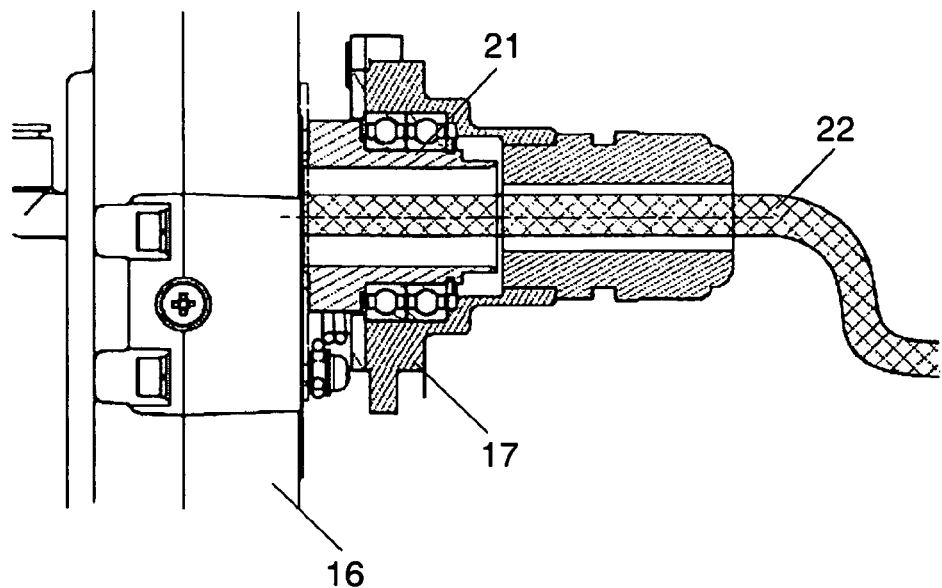
FIG. 3 is a partial sectional view showing a vicinity of a fixing device for a welding wire feeder of the industrial robot in accordance with the exemplary embodiment of the present invention.

FIG. 3 is a partial sectional view showing a vicinity of fixing device 17. Rotating hollow pipe shaft (hereinafter, referred to as "shaft") 21 is provided to fixing device 17 and is located on the rotation center of the fixing device 17 to constitute rotation axis 17A. Feeder cable (hereinafter, refereed to as "cable") 22 electrically couples feeder 16 to the inside of the industrial robot. Cable 22 is wired through the inside of shaft 21.

Figure 4:
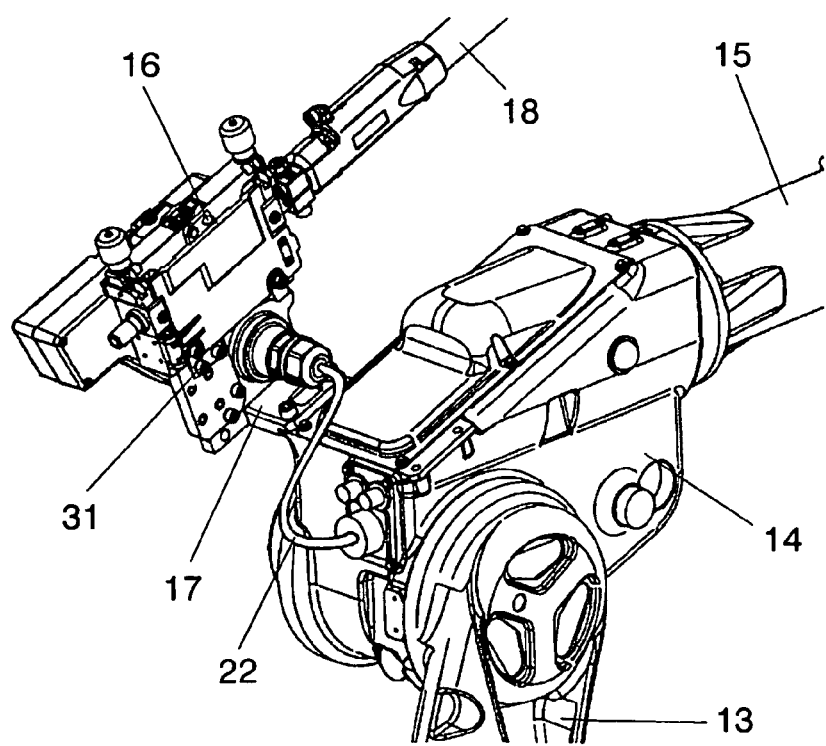
FIG. 4 shows a state in which a rotation angle of the welding wire feeder of the industrial robot is fixed by the fixing device in accordance with the exemplary embodiment of the present invention.

FIG. 4 is a perspective view showing a state in which a rotation angle of feeder 16 is fixed by fixing device 17 at the time of floor-mounted use shown in FIG. 1. In this case, feeder 16 is fixed facing upward. Note here that rotation fixing portion 31 that is a part of fixing device 17 fixes feeder 16 at a predetermined angle.

Figure 5:
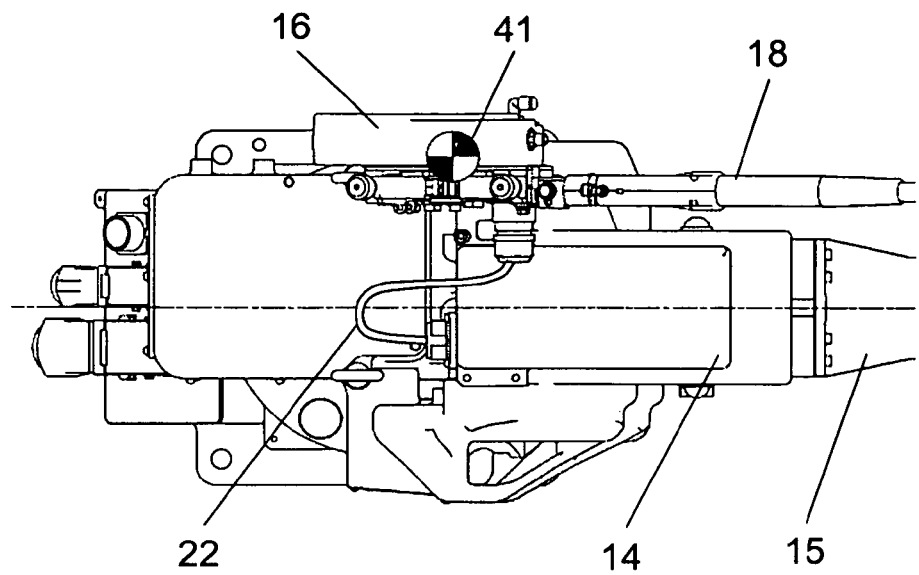
FIG. 5 is a top view showing the industrial robot in accordance with the exemplary embodiment of the present invention.
Figure 6:
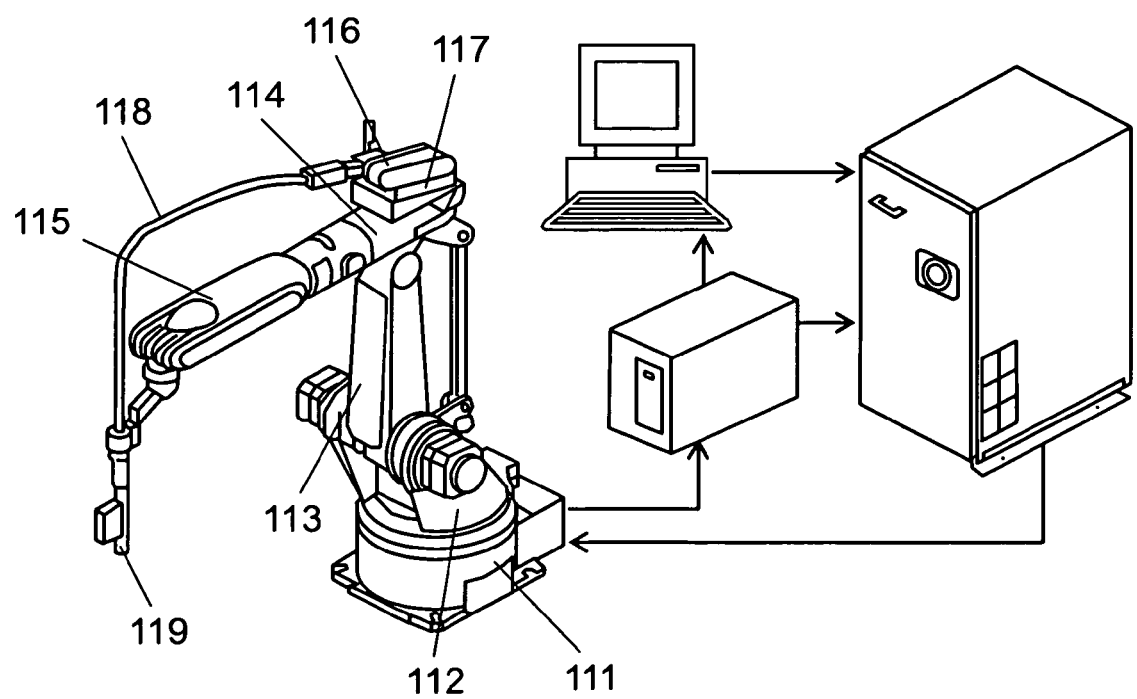
FIG. 6 is a perspective view showing a state of a conventional industrial robot at the time of floor-mounted installation.
Figure 7:
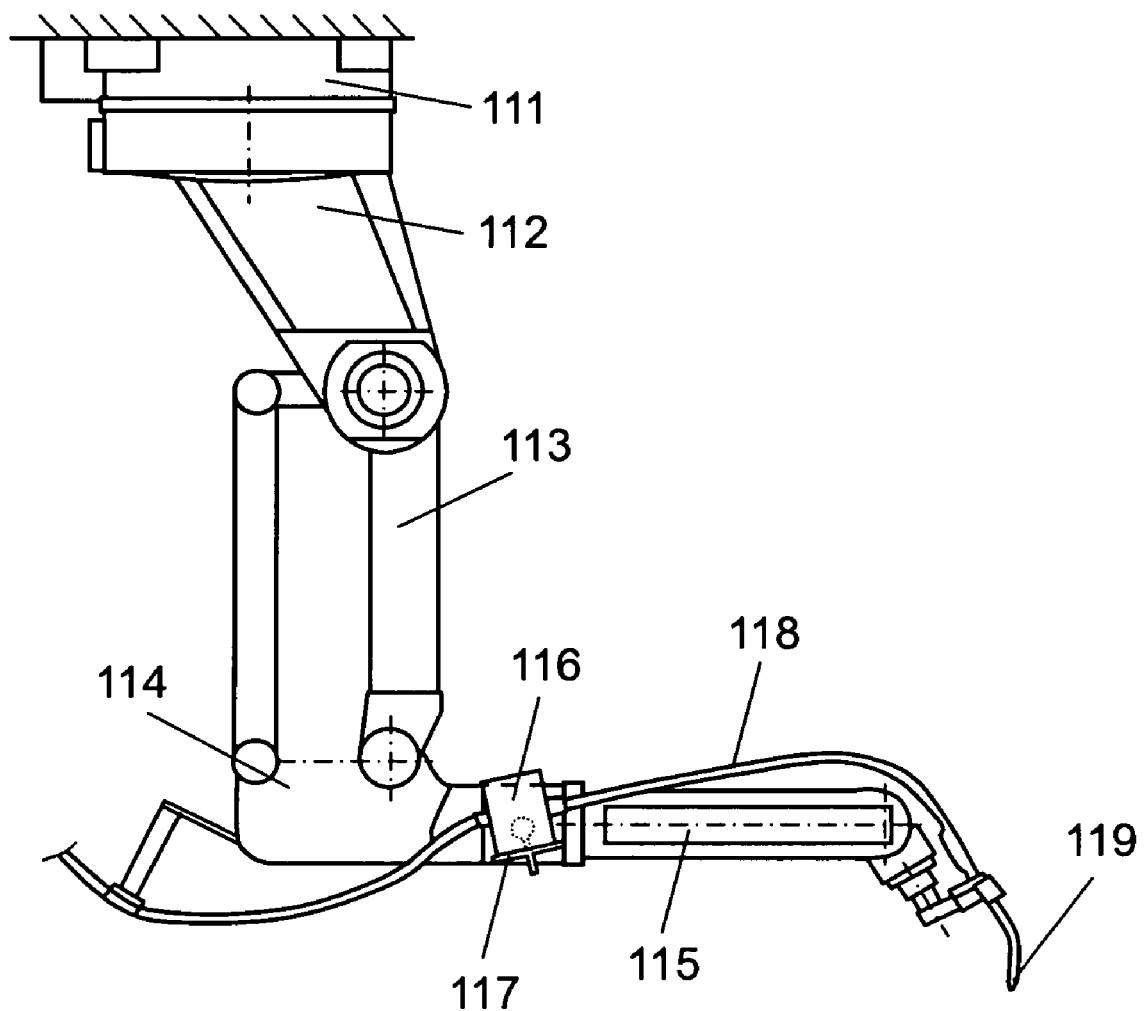
FIG. 7 is a side view showing a state of a conventional industrial robot at the time of ceiling-mounted installation.

FIG. 5 partially shows a state in which feeder 16 is fixed on second arm 14 at the time of floor-mounted use shown in FIG. 1, which is seen from the upper side of the industrial robot to the side of a floor surface. Location of gravity center 41 of schematically represents a location of the center of gravity of feeder 16.

Next, in the industrial robot having the above-mentioned configuration, the use form of the industrial robot is described as to the case in which floor-mounted use shown in FIG. 1 is changed to the ceiling-mounted use shown in FIG. 2 as an example. Firstly, the industrial robot is fixed to a ceiling surface (not shown) by using base 11. Next, feeder 16 is rotated around rotation axis 17A of fixing device 17 from the state shown in FIG. 1 to the state shown in FIG. 2 and fixed. That is to say, feeder 16 is fixed facing downward (to the side of the ceiling). Next, third arm 15 is rotated by 180° into a posture shown in FIG. 2, the industrial robot is made in a state capable of welding a work (not shown) located at the side of a floor surface (not shown), for example.

Thus, fixing device 17 for fixing feeder 16 to second arm 14 can be commonly used at the time of floor-mounted use and the time of ceiling-mounted use. That is to say, it is not necessary that fixing devices are provided independently at the time of the floor-mounted use and the time of ceiling-mounted use. Furthermore, the position to which the fixing device is attached is common and the position is not required to be changed.

Furthermore, fixing device 17 is provided with rotation axis 17A that allows feeder 16 to rotate. Then, according to whether floor-mounted installation or ceiling-mounted installation, feeder 16 is allowed to rotate around rotation axis 17A. Thus, by changing an angle of feeder 16, the position of torch cable 18 can be changed into the direction suitable for the time of the floor-mounted use and ceiling-mounted use. That is to say, an attachment angle of feeder 16 is changed by rotating feeder 16 without changing the position to which feeder 16 is attached between the time of floor-mounted use and the time of ceiling-mounted use. Since only this configuration can correspond to both the floor-mounted use and ceiling-mounted use of an industrial robot, an industrial robot with excellent workability can be obtained.

Note here that depending on a method of carrying out welding and a shape of a welding base material, and the like, torch cable 18 may be required to be fixed in order to restrict the interference range of touch cable 18. In such a case, by using rotation fixing part 31, a bolt, or the like, shown in FIG. 4, feeder 16 can be fixed at an angle necessary to avoid interference of torch cable 18.

Furthermore, as shown in FIGS. 3 and 4, cable 22 passes through the inside of shaft 21. With such a structure, even when feeder 16 is rotated, layout of cable 22 inside shaft 21 constituting rotation axis 17A is not affected. That is to say, when an industrial robot is changed from the floor-mounted use to the ceiling-mounted use, or when an industrial robot is changed from the ceiling-mounted use to the floor-mounted use, it is not necessary to change layout or coupling of cable 22. Therefore, workability associated with the change between the floor-mounted use and the ceiling-mounted use of the industrial robot can be improved.

Furthermore, as shown in FIG. 5, in order to allow feeder 16 to rotate, it is preferable that a position to which feeder 16 is attached is offset to a position apart from third arm 15. At this time, offsetting is carried out at minimum to a degree in which torch cable 18 attached to feeder 16 does not interfere with second arm 14 and third arm 15. With this attachment position, the distance between location of the gravity center 41 of feeder 16 and a pivot axis of third arm 15 is reduced. Therefore, a moment load applied to fixing device 17 for fixing feeder 16 to second arm 14 becomes small. Note here that, the shorter the distance between the location of the gravity center 41 and the pivot axis of third arm 15 is, the smaller the moment load becomes. Therefore, it is desirable that at least a part of feeder 16 is located on second arm 14.

As mentioned above, with the configuration in which the distance between location of the gravity center 41 and the pivot axis of third arm 15 is short, a strong attachment member for attaching feeder 16 is not required to be provided. Thus, the industrial robot can have a compact size and light weight.

Note here that, in this exemplary embodiment, fourth arm 13 is pivotably provided between first arm 12 and second arm 14. However, feeder 16 may be provided on second arm 14 in an industrial robot that does not have fourth arm 13.

INDUSTRIAL APPLICABILITY

An industrial robot of the present invention can be used both at the time of floor-mounted use and ceiling-mounted use. Therefore, it is useful as an industrial robot capable of carrying out welding and the like, by mounted on a floor, on a ceiling, or the like.

The invention claimed is:

1. An industrial robot capable of being used in a floor-mounted state and a ceiling-mounted state, comprising:
   a base for installation;
   a first arm rotatably attached to the base;
   a second arm being pivotable with respect to the first arm;
   a third arm pivotably attached to the second arm;
   a rotatable wire feeder having a fixing device including a rotation axis and coupling to the second arm;
   a welding torch;
   a torch cable for feeding a welding wire to the welding torch, the torch cable coupled to the wire feeder;
   a rotating hollow pipe shaft located coaxially with the rotation axis of the wire feeder; and
   a feeder cable electrically coupling between an inside of the industrial robot and the wire feeder, the feeder cable passing through the rotating hollow pipe shaft from a first end to a second end opposite the first end.

2. The industrial robot according to claim 1, further comprising a rotation fixing part for fixing an rotation angle of the wire feeder.

3. The industrial robot according to claim 1, wherein a position to which the wire feeder is attached is offset to a position apart from the third arm.

4. The industrial robot according to claim 1, wherein at least a part of the wire feeder is located on the second arm.

5. The industrial robot according to claim 1, further comprising a fourth arm pivotably attached to the first arm and the second arm.

6. The industrial robot according to claim 5, wherein the fourth arm is attached to one side face of the first arm and one side face of the second arm, and the wire feeder is located opposite to the fourth arm relatively to a rotating axis of the first arm.

7. An industrial robot capable of being used in a floor-mounted state and a ceiling-mounted state, comprising:
   a base for installation;
   a first arm rotatably attached to the base;
   a second arm being pivotable with respect to the first arm;
   a third arm pivotably attached to the second arm;
   a fourth arm attached to one side face of the first arm and one side face of the second arm, the fourth arm pivotable with respect to the first arm and the second arm;
   a rotatable wire feeder having a fixing device including a rotation axis and coupling to the second arm, the wire feeder located opposite to the fourth arm relative to a rotating axis of the first arm;
   a welding torch; and
   a torch cable for feeding a welding wire to the welding torch, the torch cable coupled to the wire feeder.

8. The industrial robot according to claim 7, further comprising a feeder cable for electrically coupling between an inside of the industrial robot and the wire feeder;
   wherein the rotation axis is composed of a rotating hollow pipe shaft, and the feeder cable passes through the rotating hollow pipe shaft.

9. The industrial robot according to claim 7, further comprising a rotation fixing part for fixing an rotation angle of the wire feeder.

10. The industrial robot according to claim 7, wherein a position to which the wire feeder is attached is offset to a position apart from the third arm.

11. The industrial robot according to claim 7, wherein at least a part of the wire feeder is located on the second arm.

* * * * *